United States Patent
Wang et al.

(10) Patent No.: US 8,724,269 B2
(45) Date of Patent: May 13, 2014

(54) ESD PROTECTION CIRCUIT

(75) Inventors: Wen-Tai Wang, Hsinchu County (TW); Sheng-Tsai Huang, Hsinchu County (TW); Chao-Yen Huang, Taipei (TW)

(73) Assignees: Global Unichip Corporation, Hsinchu (TW); Taiwan Semiconductor Manufacturing Co., Ltd., Hsin-Chu (TW)

( * ) Notice: Subject to any disclaimer, the term of this patent is extended or adjusted under 35 U.S.C. 154(b) by 205 days.

(21) Appl. No.: 13/352,724

(22) Filed: Jan. 18, 2012

(65) Prior Publication Data

US 2012/0182654 A1   Jul. 19, 2012

(30) Foreign Application Priority Data

Jan. 19, 2011   (TW) ............... 100102008 A

(51) Int. Cl.
*H02H 9/04* (2006.01)
(52) U.S. Cl.
USPC .......................................................... 361/56
(58) Field of Classification Search
CPC .... H02H 9/04–9/049; H01L 27/0248–27/0296
USPC .......................................................... 361/56
See application file for complete search history.

(56) References Cited

U.S. PATENT DOCUMENTS 7,221,551 B2 *   5/2007   Chen ............................. 361/230
7,397,280 B2 *   7/2008   Ker et al. ........................ 326/80

OTHER PUBLICATIONS

Anne-Johan Annema et al, "5.5V Tolerant I/O in a 2.5V 0.25μm CMOS Technology", 2000, pp. 417-420, IEEE 2000 Custom Integrated Circuits Conference.
Hector Sanchez et al, "A Versatile 3.3/2.5/1.8-V CMOS I/O Driver Built in a 0.2-μm, 3.5-nm Tox, 1.8-V CMOS Technology", Nov. 1999, pp. 1501-1511, vol. 34, IEEE Journal of Solid-State Circuits.

* cited by examiner

*Primary Examiner* — Jared Fureman
*Assistant Examiner* — Kevin J Comber
(74) *Attorney, Agent, or Firm* — WPAT, PC; Justin King

(57) ABSTRACT

ESD protection circuit is provided, which includes a detection circuit, a trigger circuit and a clamp circuit. The detection circuit includes two stacked capacitors reflecting occurrence of ESD events. The trigger circuit includes three stacked transistors controlling triggering of the clamp circuit according to operation of the detection circuit. The clamp circuit includes two stacked transistors conducting ESD path when triggered.

13 Claims, 3 Drawing Sheets

US 8,724,269 B2

ESD PROTECTION CIRCUIT

This application claims the benefit of Taiwan application Serial No. 100102008, filed Jan. 19, 2011, the subject matter of which is incorporated herein by reference.

FIELD OF THE INVENTION

The present invention relates to an ESD protection circuit, and more particularly, to an ESD protection circuit applicable to high supply voltage with stack architecture of advanced devices.

BACKGROUND OF THE INVENTION

Semiconductor chips (dices, integrated circuits) are the most important building hardware in modern information society. Circuitry functional blocks of different functions are integrated into a chip, and different circuitry functional blocks have different requirements of supply voltage(s); therefore, different power domains are arranged inside the chip for providing different supply voltages. For example, input/output circuits of a chip for exchanging data and signals with external via input/output (I/O) pads need higher supply voltage of, e.g., 3.3 Volts; on the other hand, core circuit of a chip, such as logic operation circuitry, operates in lower supply voltage of, e.g., 1.8 Volts. Power required for chip operation is drained from external via power pads of a chip, and different supply voltages are transmitted to circuitry functional blocks of different power domains by various power rails inside the chip.

As semiconductor manufacture process evolves toward advanced process of deep sub-micron, advanced devices (e.g., transistors) of smaller area, lower power consumption and higher speed are utilized to construct circuitry functional blocks inside a chip. However, due to low voltage tolerance of advanced devices, advanced devices are suitable for circuitry functional blocks of low supply voltage rather than circuitry functional blocks of high supply voltage.

To prevent chip damage caused by electro-static discharge (ESD) during transportation, processing, assembly and testing, ESD protection mechanism is arranged in a chip, and the externally exposed power pads and I/O pads of a chip are key spots for implementation of the ESD protection mechanism. For example, an ESD protection circuit can be arranged between a first power rail and a second power rail, in cooperation with a conductive discharge path arranged between an I/O pad and the first power rail. With such arrangement, when an ESD event occurs between the I/O pad and a power pad of the second power rail, current of ESD can be conducted from the I/O pad to the first power rail by the discharge path, and then be conducted to the second power rail by the ESD protection circuit, so the current of ESD flows out of the chip via the power pad of the second power rail with other circuitry functional blocks bypassed, thus ESD protection is achieved.

In an ESD protection circuit of a prior art, two staked transistors are included; source-drain channels of the two transistors are serially connected between power rails of 3.3 Volts and 0 Volts (ground), and a gate is coupled to a power rail of 1.8 Volts. To work with such ESD protection circuit, an I/O circuit needs two p-channel metal-oxide-semiconductor (MOS) transistors stacked between the 3.3 Volts power rail and an I/O pad, and another two n-channel MOS transistors stacked between the I/O pad and the 0 Volts power rail. These two pairs of stacked transistors are not only used to drive signal output, but also used to conduct the I/O pad to the 3.3 Volts power rail or the 0 Volts power rail during ESD events.

A shortcoming of the prior art is that the ESD protection demands larger layout area to implement the two pairs of stacked MOS transistors, and therefore degrades chip integrity and enlarges total area of chip.

In an ESD protection circuit of another prior art, serial resistor-capacitor is arranged between the 3.3 Volts power rail and the 0 Volts power rail to detect whether ESD event occurs, a voltage at a node between the resistor and the capacitor is inverted by an inverter to control conduction of a clamp transistor. The inverter operates between the 3.3 Volts power rail and the 0 Volts power rail; a drain and a source of the clamp transistor are also coupled between the 3.3 Volts power rail and the 0 Volts power rail, and a gate is controlled by the inverter.

From the aforementioned description, it is recognized that these ESD protection circuits of prior arts need to operate under high supply voltage of 3.3 Volts, and are difficult to be implemented by advanced devices.

SUMMARY OF THE INVENTION

An objective of the invention is providing an ESD protection circuit having a first, a second and a third supply terminals, and including a detection circuit, a trigger circuit and a clamp circuit. The first, second and third supply terminals are arranged to couple to a first supply voltage, a second supply voltage and a base supply voltage, respectively. The first supply voltage is higher than the second supply voltage.

The detection circuit has a first respond terminal and a second respond terminal, and includes a first capacitor, a second capacitor, a first resistance circuit and a resistor. The first capacitor is coupled between the first respond terminal and the second respond terminal, the second capacitor is coupled between the second respond terminal and the third supply terminal. The first resistance circuit is coupled between the first supply terminal and the first respond terminal for providing a first equivalent resistance between the first supply terminal and the first respond terminal. The resistor is coupled between the second supply terminal and the second respond terminal.

The trigger circuit has a first trigger terminal and a second trigger terminal, and includes a first, a second and a third trigger transistors. The first trigger transistor is coupled between the first respond terminal, the first supply terminal and the first trigger terminal; the second trigger transistor is coupled between the second respond terminal, the first trigger terminal and the second trigger terminal; the third transistor is coupled between the second respond terminal, the second trigger terminal and the third supply terminal.

The clamp circuit has a first controlled terminal and a second controlled terminal respectively coupled to the first trigger terminal and the second trigger terminal, and includes a first clamp transistor, a second clamp transistor and a second resistance circuit. The first clamp transistor has a first gate, a first drain and a first source respectively coupled to the first controlled terminal, the first supply terminal and a first node. The second clamp transistor has a second gate, a second drain and a second source respectively coupled to the second controlled terminal, the first node and the third supply terminal. The second resistance circuit is coupled between the first controlled terminal and the second supply terminal for providing a second equivalent resistance between the first controlled terminal and the second supply terminal.

In the detection circuit, the first capacitor can be implemented by a p-channel MOS transistor having a first capacitor gate, a first capacitor source and a first capacitor drain respectively coupled to the second respond terminal, the first respond terminal and the first respond terminal. The second capacitor can be implemented by an n-channel MOS transistor having a second capacitor gate, a second capacitor source and a second capacitor drain respectively coupled to the second respond terminal, the third supply terminal and the third supply terminal.

In the trigger circuit, the first trigger transistor and the second trigger transistor can be p-channel MOS transistors, and the third trigger transistor can be an n-channel MOS transistor.

In the clamp circuit, the first clamp transistor and the second clamp transistor can be n-channel MOS transistors.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
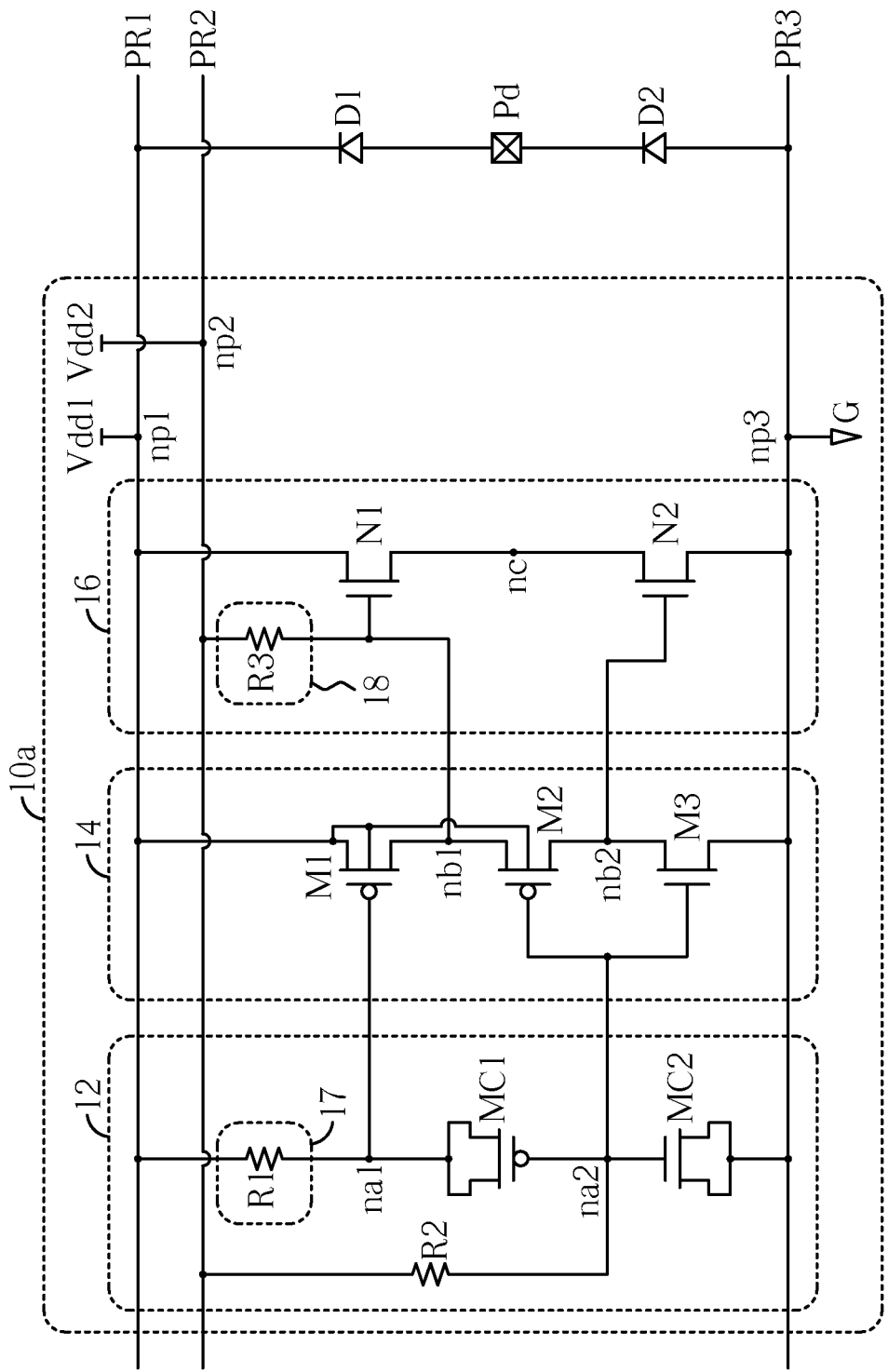
FIG. 1 to FIG. 3 respectively illustrate ESD protection circuits according to different embodiment of the invention.

Please refer to FIG. 1 illustrating an ESD protection circuit 10a according to an embodiment of the invention. Nodes np1, np2 and np3 are supply terminals coupled to power rails PR1, PR2 and PR3 corresponding to supply voltages Vdd1, Vdd2 and G for coupling the supply voltages Vdd1, Vdd2 and G, respectively; wherein the supply voltage Vdd1 is higher than the supply voltage Vdd2. For example, the supply voltages Vdd1 and Vdd2 can respectively be 3.3 Volts and 1.8 Volts, and the supply voltage G is ground supply voltage of 0 Volts. The ESD protection circuit 10a includes a detection circuit 12, a trigger circuit 14 and a clamp circuit 16.

The detection circuit 12 has nodes na1 and na2 as two respond terminals, and includes transistors MC1 and MC2, a resistance circuit 17 and a resistor R2. The transistor MC1 can be a p-channel MOS transistor has a gate coupled to the node na2, and has a source and a drain commonly coupled to the node na1 for implementing a capacitor. The transistor MC2 can be an n-channel MOS transistor has a gate coupled to the node na2, and has a source and a drain commonly coupled to the node np3 for implementing another capacitor. The resistance circuit 17 includes a resistor R1 coupled between the nodes np1 and na1. The resistor R2 is coupled between the nodes np2 and na2.

The trigger circuit 14 has nodes nb1 and nb2 as two trigger terminals, and includes three transistors M1, M2 and M3. The transistor M1 and M2 can be p-channel MOS transistors, the transistor M3 can be an n-channel MOS transistor. A gate, a source and a drain of the transistor M1 are respectively coupled to the nodes na1, np1 and nb1, and a bulk is coupled to the node np1. A gate, a source and a drain of the transistor M2 are respectively coupled to the nodes na2, nb1 and nb2, and a bulk is coupled to the node np1. A gate, a source and a drain of the transistor M3 are respectively coupled to the nodes na2, np3 and nb2.

The clamp circuit 16 is coupled to the trigger circuit 14 at the nodes nb1 and nb2 which are also two controlled terminals, and includes two transistors N1, N2 and a resistance circuit 18. The transistors N1 and N2 can be n-channel MOS transistors; a gate, a drain and a source of the transistor N1 are respectively coupled to the nodes nb1, np1 and nc, a gate, a drain and a source of the transistor N2 are respectively coupled to the nodes nb2, nc and np3. The resistance circuit 18 includes a resistor R3 coupled between the nodes nb1 and np2.

The ESD protection circuit 10a can be applied to a chip; with the ESD protection circuit 10a being adopted, only a simple diode D1 is used for implementing an ESD discharge path between a pad Pd (e.g., an I/O pad) and the power rail PR1; there is no need to use stacked driving transistors in I/O circuit of the pad Pd. An anode and a cathode of the diode D1 are respectively coupled to the pad Pd and the power rail PR1. Similarly, only a diode D2 is installed between the power rail PR3 and the pad Pd, with an anode and a cathode of the diode D2 respectively coupled to the power rail PR3 and the pad Pd.

ESD protection implemented by the ESD protection circuit 10a can be exemplarily described as follows. When an ESD event occurs between the pad Pd and the power rail PR3 with a rapid voltage ramp at the pad Pd, the diode D1 conducts, so the voltage at the power rail PR1 also rises following the voltage at the pad Pd. In the detection circuit 12, because the capacitor-resistor network of the transistors MC1, MC2 and the resistors R1, R2 does not instantaneously respond to the rapid voltage ramp of the power rail PR1, the voltages at the nodes na1 and na2 will maintain a low level (comparing to high level voltage of the power rail PR1). Therefore, the transistors M1 and M2 turn on, and the high voltage of the power rail PR1 is conducted to the nodes nb1 and nb2, so the transistors N1 and N2 are triggered to turn on. The turned-on transistors N1 and N2 conducts the power rail PR1 to the power rail PR3, such that ESD discharge current is conducted to the power rail PR3 and flows out of the chip. In this way, ESD current will not flow to other circuitry functional blocks (not shown in FIG. 1) in the chip to cause chip damage.

Contrary to ESD events, when the chip powers on for normal operation, the transistors N1 and N2 in the ESD protection circuit 10a will not turn on, so the power rail PR1 is not erroneously conducted to the power rail PR3. During power-on of the chip, the voltages of the power rails PR1 and PR2 slowly rise to the supply voltages Vdd1 and Vdd2 respectively, so the capacitor-resistor network in the detection circuit 12 can fully respond, and the voltage at the node na1 can track the voltage of the power rail PR1. Therefore, the transistor M1 does not turn on. Similarly, the voltage at the node na2 also tracks the voltage of the power rail PR2, so the transistor M2 does not turn on. On the other hand, the transistor M3 turns on to conduct the node nb2 to the supply voltage G, such that the transistor N2 remains off without conducting. Therefore, conduction between the power rails PR1 and PR3 is prevented.

When the voltages of the power rails PR1 and PR2 are steadily kept at the supply voltages Vdd1 and Vdd2 for normal operation of the chip, the voltage at the node na2 is kept at the supply voltage Vdd2 through the resistor R2, and the voltage at the node na1 is kept at the supply voltage Vdd1 through the resistor R1. Because a stack architecture of three transistors is adopted in the trigger circuit 14, the voltages at the nodes nb1 and nb2 can be different; the voltage at the node nb1 is kept at the supply voltage Vdd2 by the resistor R3, and the voltage at the node nb2 matches the supply voltage G due to conduction of the transistor M3. Therefore, gate-source voltage differences, gate-drain voltage differences and source-drain voltage differences of the transistors M1, M2 and M3 are kept below respect voltage tolerance of advanced devices. Accordingly, the ESD protection circuit 10a can be composed by advanced devices.

Figure 2:
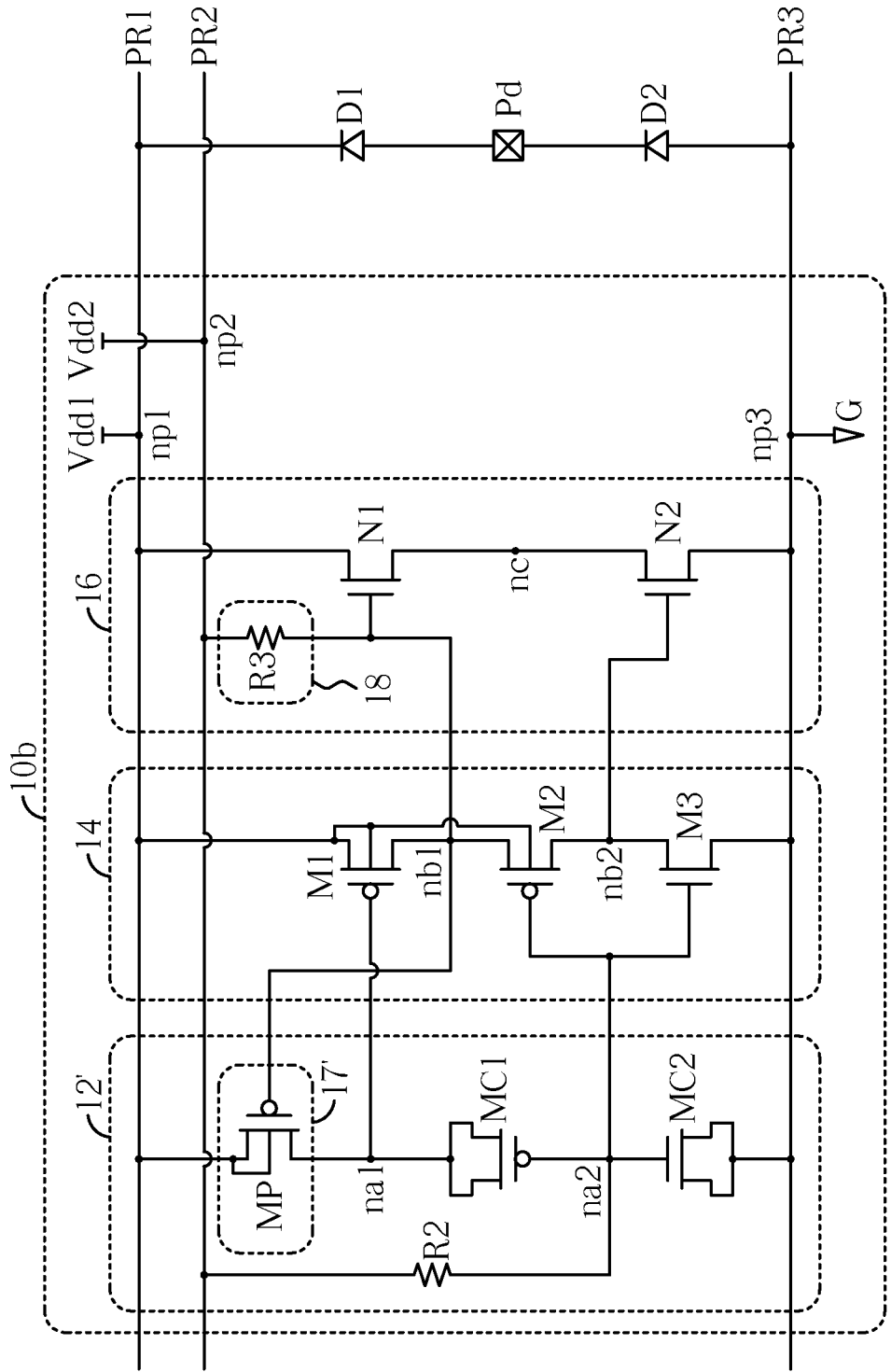

Please refer to FIG. 2 illustrating an ESD protection circuit 10b according to another embodiment of the invention. The ESD protection circuit 10n includes a detection circuit 12', as well as the trigger circuit 14 and the clamp circuit 16 of FIG. 1. Similar to the detection circuit 12, the detection circuit 12' includes two transistors MC1 and MC2 as two capacitors, as well as a resistor R2. For a difference, a resistance circuit 17' in the detection circuit 12' adopts a transistor MP to provide a variable equivalent resistance between the nodes np1 and na1. The transistor MP can be a p-channel MOS transistor with a long channel; a gate, a source and a drain of the transistor MP are respectively coupled to the nodes nb1, np1 and na1, and a bulk is coupled to the node np1.

When ESD event occurs, the transistor MP provides a high equivalent resistance between the nodes np1 and na1. During normal operation of the chip, the transistor MP provides a low equivalent resistance between the nodes np1 and na1, so the voltage at the node na1 can approach (and track) the supply voltage Vdd1 at the node np1, and leakage current drained from the power rail PR1 by the transistors M1 to M3 is reduced.

Figure 3:
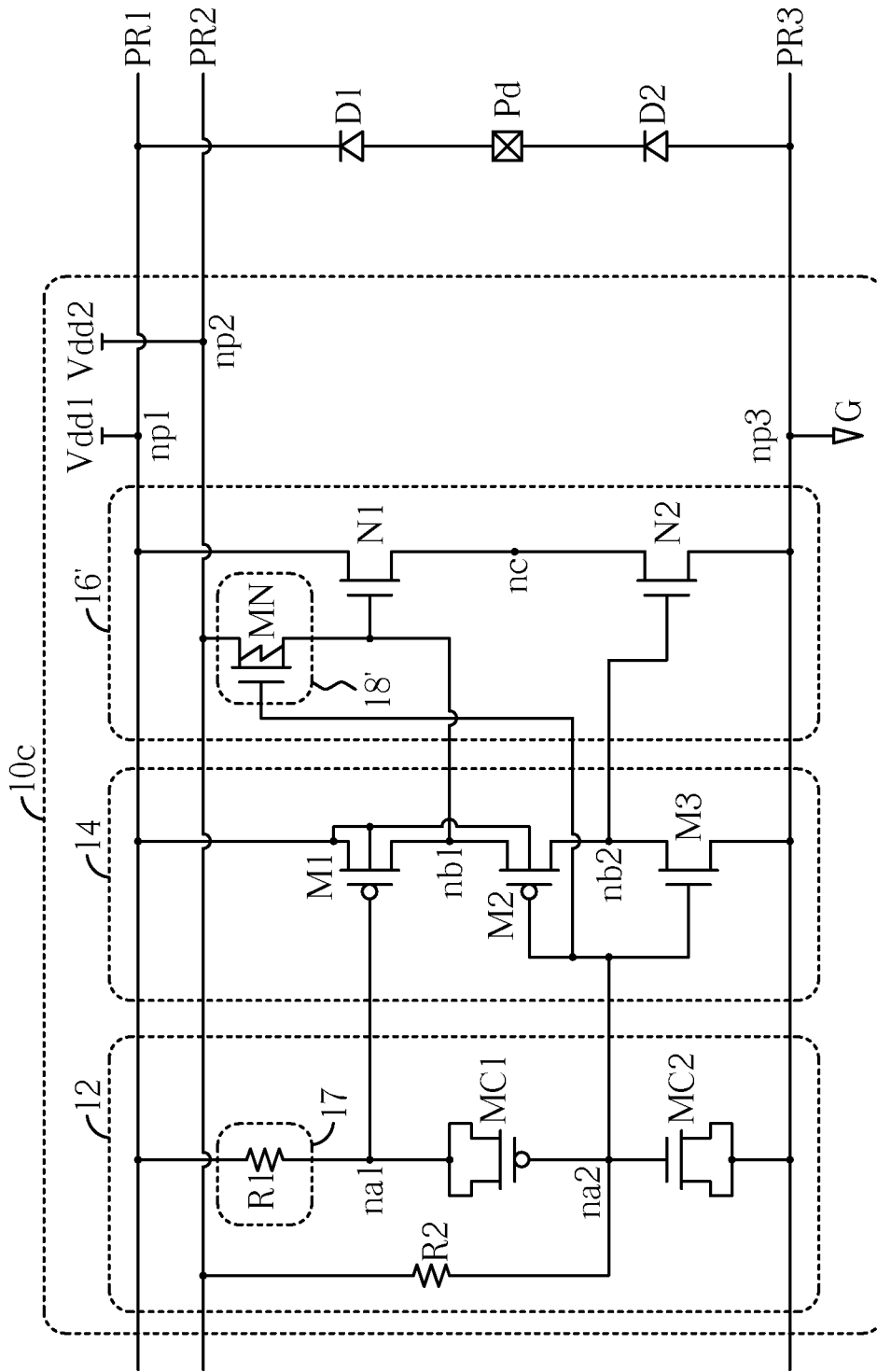

Please refer to FIG. 3 illustrating an ESD protection circuit 10c according to another embodiment of the invention. The ESD protection circuit 10c adopts the detection circuit 12 and the trigger circuit 14 of FIG. 1, and also includes a clamp circuit 16'. Similar to the clamp circuit 16 of FIG. 1, the clamp circuit 16' includes two transistors N1 and N2; for a difference, a resistance circuit 18' in the clamp circuit 16' adopts a transistor MN, which is a native device, to provide a variable equivalent resistance between the nodes nb1 and np2. The transistor MN can be a MOS transistor of long channel; there are no carriers doped in the channel, so a threshold voltage for turning on the transistor MN is lowered to 0 Volts. A gate of the transistor MN is coupled to the node na2; a source and a drain are coupled between the nodes np2 and nb1.

During ESD event, the transistor MN provides a high equivalent resistance between the nodes np2 and nb1. During normal operation of the chip, the transistor MN provides a low equivalent resistance between the nodes np2 and nb1 to absorb leakage current of the transistor M1, as well as displacement current through large capacitor between drain and gate of the transistor N1, therefore the voltage at the node nb2 is ensured to closely approach the supply voltage G.

To sum up, comparing to prior arts, the invention loosens I/O circuit design constrains which are set for ESD protection mechanism, simplifies circuit architecture of 10 circuits, and reduces layout area of 10 circuits; in addition, the invention is suitable to be composed by advanced devices.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An ESD protection circuit comprising:
    a first supply terminal, a second supply terminal and a third supply terminal for coupling a first supply voltage, a second supply voltage and a base supply voltage respectively;
    a detection circuit having a first respond terminal and a second respond terminal, and comprising:
        a first capacitor coupled between the first respond terminal and the second respond terminal;
        a second capacitor coupled between the second respond terminal and the third supply terminal;
        a first resistance circuit coupled between the first supply terminal and the first respond terminal for providing a first equivalent resistance between the first supply terminal and the first respond terminal; and
        a resistor coupled between the second supply terminal and the second respond terminal;
    a trigger circuit having a first trigger terminal and a second trigger terminal, and comprising:
        a first trigger transistor coupled between the first respond terminal, the first supply terminal and the first trigger terminal;
        a second trigger transistor coupled between the second respond terminal, the first trigger terminal and the second trigger terminal; and
        a third trigger transistor coupled between the second respond terminal, the second trigger terminal and the third supply terminal; and
    a clamp circuit having a first controlled terminal and a second controlled terminal respectively coupled to the first trigger terminal and the second trigger terminal, and comprising:
        a first clamp transistor having a first gate, a first drain and a first source respectively coupled to the first controlled terminal, the first supply terminal and a first node;
        a second clamp transistor having a second gate, a second drain and a second source respectively coupled to the second controlled terminal, the first node and the third supply terminal; and
        a second resistor having a first connection terminal and a second connection terminal, wherein the first connection terminal is coupled to the second supply terminal, and the second connection terminal is directly connected to the first controlled terminal and the first trigger terminal.

2. The ESD protection circuit as claimed in claim 1, wherein the first capacitor is a p-channel MOS transistor having a first capacitor gate, a first capacitor source and a first capacitor drain respectively coupled to the second respond terminal, the first respond terminal and the first respond terminal.

3. The ESD protection circuit as claimed in claim 1, wherein the second capacitor is an n-channel MOS transistor having a second capacitor gate, a second capacitor source and a second capacitor drain respectively coupled to the second respond terminal, the third supply terminal and the third supply terminal.

4. The ESD protection circuit as claimed in claim 1, wherein the first clamp transistor and the second clamp transistor are n-channel MOS transistors.

5. The ESD protection circuit as claimed in claim 1, wherein the first supply voltage is higher than the second supply voltage.

6. The ESD protection circuit as claimed in claim 1, wherein the first trigger transistor and the second trigger transistor are p-channel MOS transistors, and the third trigger transistor is an n-channel MOS transistor.

7. The ESD protection circuit as claimed in claim 1, wherein the first resistance circuit comprises a p-channel MOS transistor having a gate, a source and a drain respectively coupled to the first trigger terminal, the first supply terminal and the first respond terminal.

8. The ESD protection circuit as claimed in claim 1, wherein the first resistance circuit comprises a second resistor coupled between the first supply terminal and the first respond terminal.

9. The ESD protection circuit as claimed in claim 1, wherein the second resistance circuit comprises a transistor of native device having a gate, a source and a drain respectively coupled to the second respond terminal, the second supply terminal and the first controlled terminal.

10. The ESD protection circuit of claim 1, wherein the second equivalent resistance is greater than the normal equivalent resistance.

11. An ESD protection circuit comprising:
   a first supply terminal, a second supply terminal and a third supply terminal for coupling a first supply voltage, a second supply voltage and a base supply voltage respectively;
   a detection circuit having a first respond terminal and a second respond terminal, and comprising:
      a first capacitor coupled between the first respond terminal and the second respond terminal;
      a second capacitor coupled between the second respond terminal and the third supply terminal;
      a first resistance circuit coupled between the first supply terminal and the first respond terminal for providing a first equivalent resistance between the first supply terminal and the first respond terminal when ESD event occurs, and providing a normal equivalent resistance between the first supply terminal and the first respond terminal during normal operation, wherein the first equivalent resistance is different from the normal equivalent resistance; and
      a resistor coupled between the second supply terminal and the second respond terminal;
   a trigger circuit having a first trigger terminal and a second trigger terminal, and comprising:
      a first trigger transistor coupled between the first respond terminal, the first supply terminal and first trigger terminal;
      a second trigger transistor coupled between the second respond terminal, the first trigger terminal and the second trigger terminal; and
      a third trigger transistor coupled between the second respond terminal, the second trigger terminal and the third supply terminal; and
   a clamp circuit having a first controlled terminal and a second controlled terminal respectively coupled to the first trigger terminal and the second trigger terminal, and comprising:
      a first clamp transistor having a first gate, a first drain and a first source respectively coupled to the first controlled terminal, the first supply terminal and a first node;
      a second clamp transistor having a second gate, a second drain and a second source respectively coupled to the second controlled terminal, the first node and the third supply terminal; and
      a second resistance circuit coupled between the first controlled terminal and the second supply terminal for providing a second equivalent resistance between the first controlled terminal and the second supply terminal.

12. The ESD protection circuit of claim 11, wherein the first equivalent resistance is greater than the normal equivalent resistance.

13. An ESD protection circuit comprising:
   a first supply terminal, a second supply terminal and a third supply terminal for coupling a first supply voltage, a second supply voltage and a base supply voltage respectively;
   a detection circuit having a first respond terminal and a second respond terminal, and comprising:
      a first capacitor coupled between the first respond terminal and the second respond terminal;
      a second capacitor coupled between the second respond terminal and the third supply terminal;
      a first resistance circuit coupled between the first supply terminal and the first respond terminal for providing a first equivalent resistance between the first supply terminal and the first respond terminal; and
      a resistor coupled between the second supply terminal and the second respond terminal;
   a trigger circuit having a first trigger terminal and a second trigger terminal, and comprising:
      a first trigger transistor coupled between the first respond terminal, the first supply terminal and first trigger terminal;
      a second trigger transistor coupled between the second respond terminal, the first trigger terminal and the second trigger terminal; and
      a third trigger transistor coupled between the second respond terminal, the second trigger terminal and the third supply terminal; and
   a clamp circuit having a first controlled terminal and a second controlled terminal respectively coupled to the first trigger terminal and the second trigger terminal, and comprising:
      a first clamp transistor having a first gate, a first drain and a first source respectively coupled to the first controlled terminal, the first supply terminal and a first node;
      a second clamp transistor having a second gate, a second drain and a second source respectively coupled to the second controlled terminal, the first node and the third supply terminal; and
      a second resistance circuit coupled between the first controlled terminal and the second supply terminal for providing a second equivalent resistance between the first controlled terminal and the second supply terminal when ESD event occurs, and providing a normal equivalent resistance between the first controlled terminal and the second supply terminal during normal operation, wherein the second equivalent resistance is different from the normal equivalent resistance.

* * * * *